United States Patent
Westlin

[11] B 3,914,116
[45] Oct. 21, 1975

[54] HIGH EFFICIENCY UNIT FILTER
[75] Inventor: Karl L. Westlin, Louisville, Ky.
[73] Assignee: American Air Filter Company, Inc., Louisville, Ky.
[22] Filed: Oct. 24, 1973
[21] Appl. No.: 408,749
[44] Published under the Trial Voluntary Protest Program on January 28, 1975 as document no. B 408,749.

Related U.S. Application Data
[63] Continuation-in-part of Ser. No. 219,677, Jan. 21, 1972, abandoned.

[52] U.S. Cl. ................. 55/500; 55/521; 210/493
[51] Int. Cl.² ........................................ B01D 46/52
[58] Field of Search ........... 55/500, 497, 521, 499, 55/524, 498; 210/493, 378, 487

[56] References Cited
UNITED STATES PATENTS

| | | | |
|---|---|---|---|
| 2,681,155 | 6/1954 | Graham | 210/493 |
| 2,764,258 | 9/1956 | Bub et al. | 55/521 |
| 2,915,426 | 12/1959 | Poelman | 210/493 X |
| 2,952,333 | 9/1960 | Bush | 55/500 |
| 3,189,179 | 6/1965 | McMichael | 210/493 X |
| 3,242,656 | 3/1966 | Murphy | 210/493 X |
| 3,479,018 | 11/1969 | Jaye | 55/521 X |
| 3,581,479 | 6/1971 | Goulet | 55/521 X |
| 3,692,184 | 9/1972 | Miller | 55/498 X |

FOREIGN PATENTS OR APPLICATIONS

| | | | |
|---|---|---|---|
| 599,661 | 6/1960 | Canada | 210/493 |
| 605,848 | 6/1960 | Italy | 210/493 |
| 1,292,392 | 3/1962 | France | 210/493 |
| 536,592 | 9/1955 | Belgium | 55/500 |

Primary Examiner—Frank W. Lutter
Assistant Examiner—Neil F. Greenblum

[57] ABSTRACT

This invention relates to unit type filters and more particularly to high efficiency unit filters of the pleated type wherein a filter core of pleated filter material, formed of a strip of filter medium folded upon itself at longitudinally spaced intervals, is separated by corrugated spacer members extending into the pleats between the flanks thereof from opposite sides of the filter, with the spacer member edges being spaced from the pleat fold turns a preselected distance which advantageously is equal to at least one-half of the overall height of the spacer members and the spacer members further being adhesively secured to the adjacent filter medium by continuous one piece beads of adhesive extending across the face of the filter core to prevent movement of the spacer elements relative to the pleats and prevent the filter core and frame from racking.

1 Claim, 2 Drawing Figures

HIGH EFFICIENCY UNIT FILTER

REFERENCE TO RELATED APPLICATION

The present application is a continuation in part of U.S. Ser. No. 219,677 filed Jan. 21, 1972 for High Efficiency Unit Filter by Karl L. Westlin now abandoned.

BACKGROUND OF THE INVENTION

In high efficiency unit filters, it has long been known in the art to construct a filter core of pleated filter material from a strip of filter media folded upon itself at longitudinally spaced intervals. The flanks of the pleats have been separated by corrugated spacer members extending into the pleats between the flanks from opposite sides of the filter core to provide gas passages to the extended filtering surfaces. After the filter core has been formed it has been mounted into an open ended frame and sealed therein with a suitable sealing material applied along the longitudinal edges of the core. This sealing of the core has proven to be a complex and difficult to accomplish operation and the resulting sealed structure has not always proven effective to withstand the vibrational and shock conditions to which the filter assembly has been exposed. The present invention successfully avoids these aforementioned disadvantages, providing a high efficiency unit filter structure which is straightforward, and economical in its construction, operation, and maintainability and which is capable of withstanding a high degree of vibrational and shock stresses. Further, the present invention provides a unit filter assembly which is capable of long wear, avoiding previously known inherent tearing stresses on the filter medium. Various other features of the present invention will become obvious to one skilled in the art upon reading the portion of the disclosure set forth hereinafter.

SUMMARY OF THE INVENTION

More particularly, the present invention provides a filter comprising: an open ended housing having an upstream dirty gas inlet and a downstream clean gas outlet, the housing having disposed therein a filter core which includes (a) a strip of filter medium folded upon itself at longitudinally spaced intervals to provide a plurality of stacked pleats within the housing extending between opposite walls thereof, and having successively alternating pleat fold turns; and (b) a plurality of corrugated, thin metallic foil spacer members disposed within and extending along the flanks of the pleats to space the same, the spacer members being laterally spaced from the pleat fold turns a distance equal to at least one-half of the overall height of the spacer members, each of the spacer members being adhesively secured to the filter medium by at least two continuous one piece beads of adhesive, said adhesive in its uncured state having a viscosity of 5,000–10,000 centipoises at a temperature of 85°F, said adhesive further being disposed across the face of the filter core and in its cured state securing said spacer members thereto and providing horizontal and vertical stability to prevent movement of the spacer element relative to the filter pleats and to prevent said filter core and housing from racking.

DESCRIPTION OF THE PREFERRED EMBODIMENT

Figure 1:
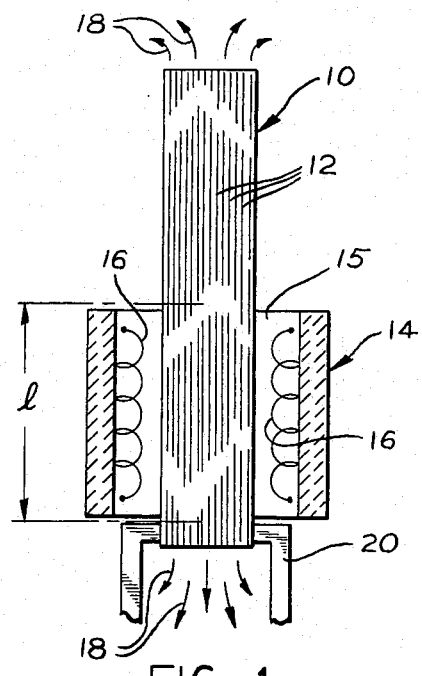
FIG. 1 is an isometric view of a unit filter assembly incorporating features of the present invention.

Referring to FIG. 1 of the drawings, the inventive filter assembly is disclosed as including open ended rectangular housing 2 having upstream dirty gas inlet 3 and downstream clean gas outlet 4. Housing 2 can be made from any one of a number of known rigid, stable materials and, advantageously, it can be made of a preselected guage metal or treated wood capable of withstanding high temperatures to which the filter assembly might be exposed. Disposed within housing 2 and sized to extend fully between opposite walls thereof is filter core 6. Core 6 is comprised of a continuous strip of filter medium 10 folded back and forth upon itself at longitudinally spaced intervals to provide a plurality of stacked pleats 7 with successively alternating pleat fold turns 8. It is to be understood that any one of a number of known filter materials can be utilized in the inventive filter assembly. Advantageously, a filter medium having fibers of submicron diameter size capable of operating at efficiencies above 99 percent can be utilized. For example, glass fiber filter medium having fiber diameters of approximately 0.7 micron to approximately 0.8 micron can be used, as can certain types of submicron organic filter materials.

Figure 2:
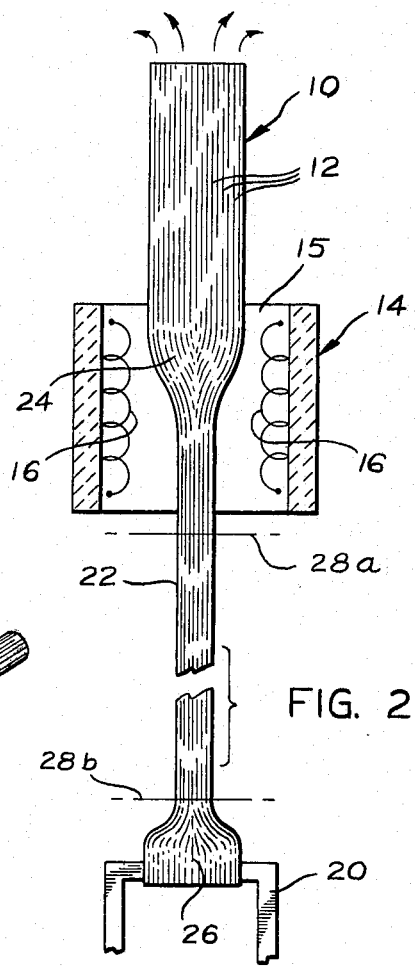
FIG. 2 is an enlarged broken away isometric view of a part of the core of the filter assembly of FIG. 1.
Figure 3:
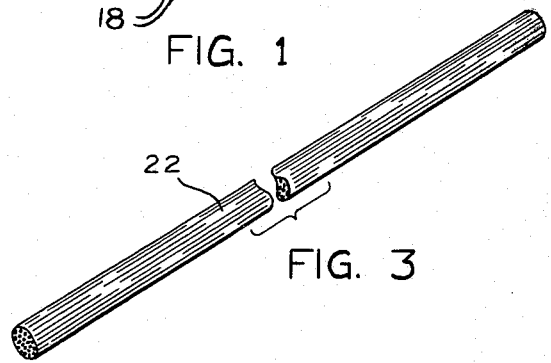
Figure 4:
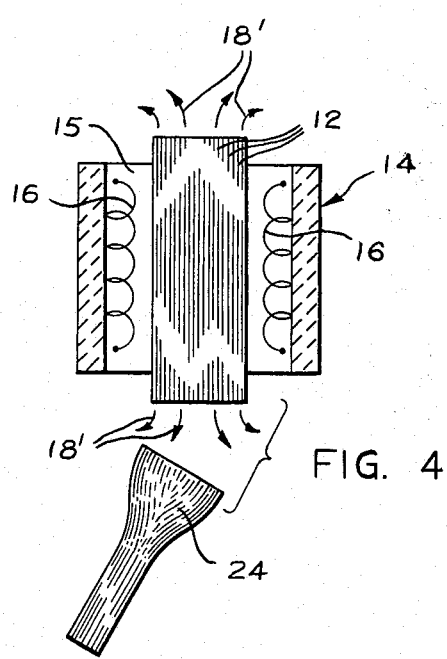
Figure 1:
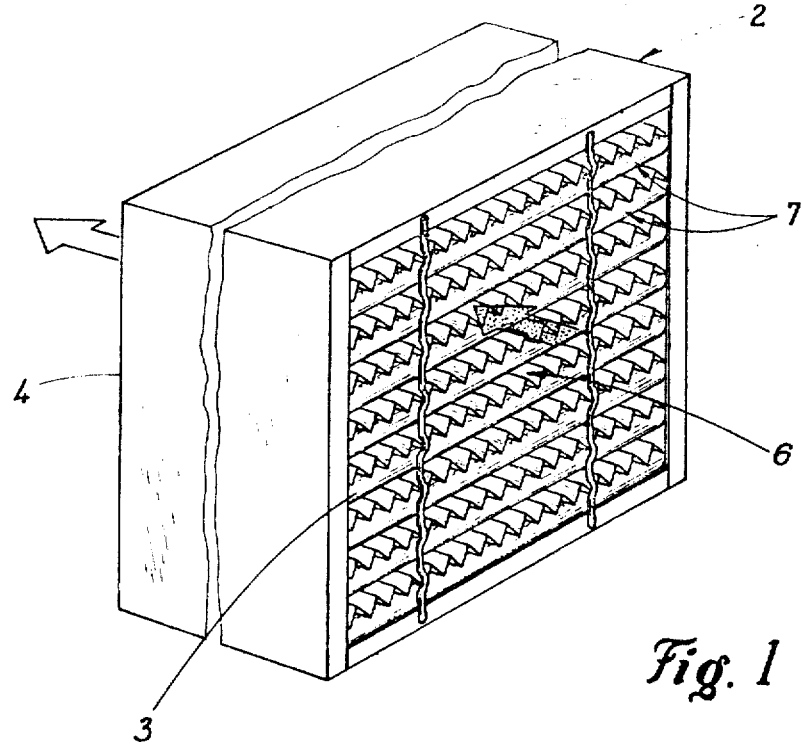
Figure 2:
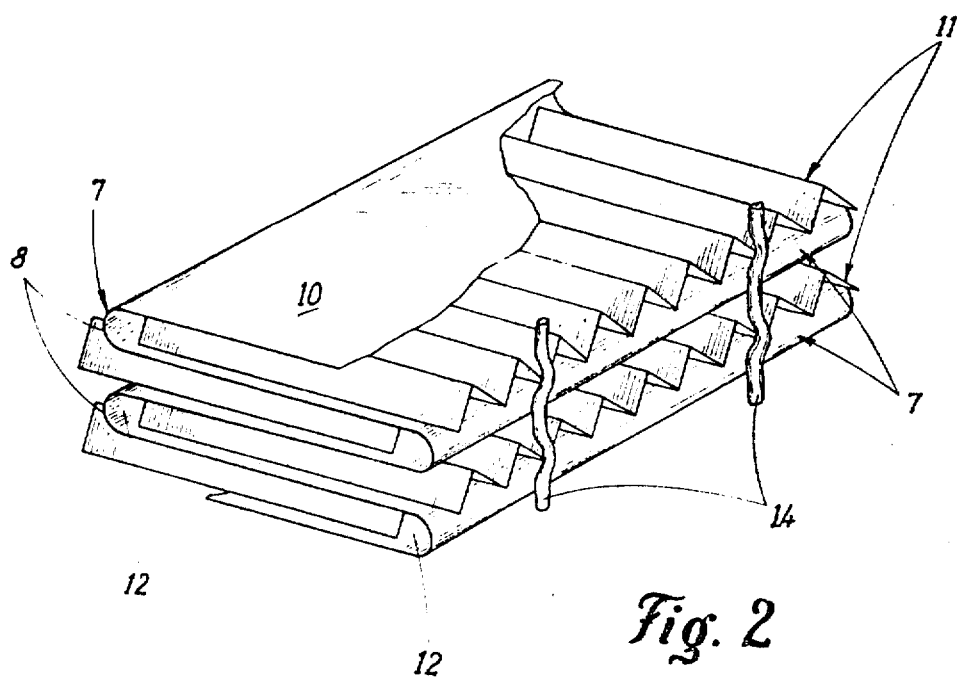

A plurality of alternately arranged corrugated spacer members 11 are disposed within and extend along the length of the pleat flanks to space the pleats and maintain them in open position to accommodate the dirty gas stream to be treated. It is to be noted that spacer members 11 as disclosed, are advantageously laterally spaced from the pleat fold turns 8 a distance equal to at least one-half of their overall height and are sized in their length along the pleat flanks to extend slightly beyond the pleats at the open ends thereof. The pleat fold turns 8 and the edges of spacer members 11 adjacent the dirty gas inlet 3 lie in substantially the same plane which plane defines the face of the filter core 6. It is to be understood that the specific lengths of the spacer members can vary so long as the inlet and outlet passages formed by the spacer members in core 6 are maintained in open position. However, it is advantageous that the lateral distance between the ends of the spacer members adjacent the pleat fold turns 8 be maintained at, at least a distance equal to one-half of the overall height of the spacer members 11 to avoid sharp creases at the point where fold turns 8 engage the ends of spacer member 11. It being understood that if the gaps 12 is less than one-half of the height of the spacer members 11 the radius of curvature of fold turns 8 will be greater than one-half the height of the spacer members 11 and a sharp crease will be present at the intersection of the spacer members 11 and the pleat fold turns 8. These spacer members can be formed from any one of a number of suitably flexible sturdy materials for example, kraft paper, chipboard or aluminum metal foil can be used. As can be seen more clearly in FIG. 2 of the drawings, gaps 12 illustrate the preselected lateral distance between spacer members 11 and the pleat fold turns 8 of the filter medium. Sizing gaps 12 equal to at least one-half of the overall height of said spacer members, minimize wear and tear of the filter medium at the fold turns which otherwise might occur because of the sharp transverse edges of the spacer members moving relative the filter medium and tearing and abrading the filter medium itself. To most effectively prevent movement of the spacer members 11 with respect to the filter medium they are adhesively secured to each other and to the continuous strip of filter medium 10 by at least two beads 14 of continuous one piece adhesive disposed across the exterior face of the filter core at the inlet 3. Generally the viscosity of the adhesive used to attach the separators and filter media is important in that too viscous of an adhesive will not properly flow around the separators and pleat fold turns before it sets. Similarly, an adhesive having a viscosity which is too low will flow into the filter core itself and not connect the separators and the filter media. Thus it has been found that the desired operable viscosity for any suitable adhesive is in the range of between about 5,000 and 10,000 centipoises at a temperature of 85°F. The adhesive is preferably selected from those adhesive collectively known as hot melt adhesives, hot melt being the term applied to those thermoplastic resinous adhesives that flow at elevated temperatures such as 350°F but upon chilling harden and become solid. These include for example, hide glues, bone glues, polyethylene base binders, polypropylene base binders, ethylene vinyl acetate binders and the like. Also cold adhesives are acceptable. Cold adhesives being the term applied to those adhesives that are applied at room temperature and after a period of time set up to become solids. These cold adhesives include solvent dispersion and emulsion type adhesives which set up to form a solid resinous material which does not crack or shatter in a temperature range from about minus 10° to 140°F. The solvent dispersion and emulsion type adhesives include adhesives from bases such as synthetic rubber, natural rubber, polyvinyl acetate and the like. Also water base type adhesives are acceptable for use in the present invention. One suitable commercially available water base adhesive is produced by the H. B. Fuller Company of Minneapolis, Minn. and is identified as number 3979X. This adhesive is a water base adhesive having a viscosity of 7,000 centipoises at a temperature of 85°F. Application of the adhesive through extruder means in the form of continuous beads extending parallel to each other laterally across the face of the core has been found to be the optimum method of securing the spacer members 11 to the filter medium. This optimum is a balance between conservation of time and equipment to apply adhesive at a number of points and satisfactorily adhesively securing the filter medium to the spacer members. It should be noted that the application of the adhesive can be effected after the core is inserted into the filter housing thus lending considerable economy to the fabrication of the filters. It should also be noted that this invention requires that the gap 12 between the spacer members 11 and the filter medium pleat turns 8 be provided in conjunction with adhesive securing of the spacer members to the filter medium. Cores having only one feature of the present invention, i.e., adhesive attachment or spacing between the spacer members and the filter medium have not proved to be satisfactory as these having a combination of both. In this regard, it should be noted that it is advantageous to establish and maintain the gap 12 not only during fabrication of the filter but during its entire life.

Fabrication of the filter element of FIG. 1 is accomplished most expeditiously by inserting the spacer members between the pleats of filter medium to form the filter core 6 and, as discussed above, passing this core under at least two nozzle means which extrude beads of adhesive 14 across the face of the filter core thus securing the spacer members with respect to the filter medium and each other. It should be noted that provision of a gap 12 between the filter medium pleats and the spacer members is critical. It should be further noted the beads of glue additionally give vertical as well as horizontal stability to core 6 with a minimum of interference to the through-passing air stream and thus prevent racking of the housing and the filter core.

To fix core 6 in housing 2 in sealed relationship therewith, so that incoming dirty gas does not by-pass the core, a sealant is provided between the outer perimeter of core 6 and the inner perimeter of housing 2. This sealant can be formed from any one of a number of gas impervious adhesives, such as plastic, ceramic, or rubber base adhesive materials. The seal can be formed by applying the sealant in an unset state around the respective perimeters of the housing and core and then inserting the core from the downstream end of the housing until it is in position. The core can then be held in that position and additional sealant material applied if necessary at the corners of the core to insure a gas pervious seal. The sealant material is then allowed to set with the core in position in the housing. The filter assembly so provided is capable of enduring extreme amounts of vibration and shock without incurring any damage. Preferably the sealant material is a polyurethane foamed material. Generally any of the polyphenylisocyanates are acceptable. One such material which is commercially available is known by the tradename Ultrafoam RUR 220-29 manufactured by General Latex & Chemical Corp. of Cambridge, Mass. Another such material is known as Hetrofoam 25050 manufactured by Durez Div. of Hooker Chemical Co. of N. Tonawanda, N.Y. Such foamed sealants generally have the following properties in the liquid form Specific Gravity at 70°F 1.3, Brookfield viscosity, cps 700–800 and curing time of 20–30 minutes at 120°F.

Having thus described the invention what is claimed is:

1. A filter comprising: an open ended housing having an upstream dirty gas inlet and a downstream clean gas outlet, said housing having disposed therein a filter core which includes (a) a strip of filter medium folded upon itself at longitudinally spaced intervals to provide a plurality of stacked pleats within said housing extending between opposite walls thereof, and having successively alternating pleat fold turns; and (b) a plurality of corrugated thin metallic foil spacer members disposed within and extending along the flanks of said pleats to space the same, said spacer members being laterally spaced from said pleat fold turns a distance equal to at least one-half the overall height of said spacer members, each of said spacer members being adhesively secured to said filter medium by at least two continuous one piece beads of adhesive, said adhesive in its uncured state having a viscosity in the range of 5,000–10,000 centipoises at a temperature of 85°F, said adhesive further being disposed across an exterior face of said filter core and in its cured state securing said spacer members thereto and providing horizontal and vertical stability to said filter core thereby preventing movement of said spacer element relative said filter pleats and to prevent said filter core and housing from racking.

* * * * *

UNITED STATES PATENT OFFICE
CERTIFICATE OF CORRECTION

Patent No. 3,914,116　　　　　　　　Dated October 21, 1975

Inventor(s) Karl L. Westlin

It is certified that error appears in the above-identified patent and that said Letters Patent are hereby corrected as shown below:

The sheet of drawing should be canceled and the sheet of drawing shown on the attached page substituted therefor, also, the illustrative drawing on the cover sheet should be canceled and Figure 1 of the attached drawing substituted therefor.

*Signed and Sealed this*

*third* Day of *February 1976*

[SEAL]

*Attest:*

RUTH C. MASON
*Attesting Officer*

C. MARSHALL DANN
*Commissioner of Patents and Trademarks*